(12) United States Patent
Miura et al.

(10) Patent No.: US 8,020,925 B2
(45) Date of Patent: Sep. 20, 2011

(54) FRONT STRUCTURE OF CAB-OVER TYPE VEHICLE

(75) Inventors: Noriyuki Miura, Fujisawa (JP); Tatsuji Ooeda, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 209 days.

(21) Appl. No.: 12/515,572

(22) PCT Filed: Nov. 27, 2007

(86) PCT No.: PCT/JP2007/072865
§ 371 (c)(1),
(2), (4) Date: May 20, 2009

(87) PCT Pub. No.: WO2008/066046
PCT Pub. Date: Jun. 5, 2008

(65) Prior Publication Data
US 2010/0060033 A1     Mar. 11, 2010

(30) Foreign Application Priority Data
Nov. 27, 2006  (JP) .................................. 2006-318685

(51) Int. Cl.
*B60J 7/00* (2006.01)
(52) U.S. Cl. ................................. 296/190.05
(58) Field of Classification Search ............ 296/190.05, 296/190.08, 190.01; 180/89.12, 89.14, 89.1
See application file for complete search history.

(56) References Cited

U.S. PATENT DOCUMENTS

| | | | | |
|---|---|---|---|---|
| 2,210,519 A * | 8/1940 | Wollensak | ................ | 180/89.15 |
| 2,740,487 A * | 4/1956 | Murty et al. | ............... | 180/89.14 |
| 2,864,121 A * | 12/1958 | Imber et al. | ..................... | 16/308 |
| 2,873,979 A * | 2/1959 | Venditty et al. | ............... | 280/775 |
| 2,912,057 A * | 11/1959 | Wagner | ......................... | 180/68.4 |
| 2,943,693 A * | 7/1960 | Norrie | ........................ | 180/89.14 |
| 2,951,548 A * | 9/1960 | Crockett et al. | ........... | 180/89.14 |
| 3,380,773 A * | 4/1968 | Sewelin | .................. | 296/190.05 |
| 3,390,734 A * | 7/1968 | Sheerin | ......................... | 180/328 |
| 3,642,316 A * | 2/1972 | Porth et al. | ............... | 296/190.05 |
| 3,781,058 A * | 12/1973 | Ziolko et al. | ................. | 296/35.1 |
| 3,831,999 A * | 8/1974 | Sonneborn | ................ | 180/89.14 |
| 3,948,341 A * | 4/1976 | Foster | ........................ | 180/89.15 |
| 3,958,659 A * | 5/1976 | Selman | ....................... | 180/89.15 |
| 4,121,684 A * | 10/1978 | Stephens et al. | ........... | 180/89.14 |

(Continued)

FOREIGN PATENT DOCUMENTS

JP           10-316013  A     12/1998

(Continued)

*Primary Examiner* — Kiran B. Patel
(74) *Attorney, Agent, or Firm* — Sughrue Mion, PLLC

(57) ABSTRACT

A front structure of a cab-over type vehicle 1 includes a side member 10, a cab mount bracket 3, and a stiffener inner reinforcement 4. The cab mount bracket 3 is fixed to the side member 10, and includes a bracket base 31 mounted on a front end portion 15 of the side member 10 and a shaft supporting portion 30 supporting a cab 5. The stiffener inner reinforcement 4 is fixed to the side member 10, and includes a vertical wall portion 44. The vertical wall portion 44 is disposed in a direction that crosses a front-rear direction, between an upper plate 11 and a lower plate 12 of the side member 10 and below a rear end edge 36 of the bracket base 31. When a load F toward the rear is applied to the cab mount bracket 3, the vertical wall portion 44 suppresses upward bending deformation of the front end portion 15 of the side member 10.

2 Claims, 4 Drawing Sheets

U.S. PATENT DOCUMENTS

| | | | |
|---|---|---|---|
| 4,206,826 A * | 6/1980 | McMillen et al. | 180/328 |
| 4,210,221 A * | 7/1980 | McMillen et al. | 180/328 |
| 4,378,856 A * | 4/1983 | Miller | 180/89.14 |
| 4,483,409 A * | 11/1984 | Fun | 180/89.15 |
| 4,493,386 A * | 1/1985 | Sonneborn | 180/89.15 |
| 4,556,118 A * | 12/1985 | London | 180/89.15 |
| 4,921,062 A * | 5/1990 | Marlowe | 180/89.14 |
| 5,044,455 A * | 9/1991 | Tecco et al. | 180/89.13 |
| 5,839,278 A * | 11/1998 | Sonneborn | 60/403 |
| 5,992,550 A * | 11/1999 | Gronlund | 180/69.21 |
| 6,073,714 A * | 6/2000 | McHorse et al. | 180/89.14 |
| 6,547,440 B2 * | 4/2003 | Testroet et al. | 384/215 |
| 6,874,816 B2 * | 4/2005 | Herrmann et al. | 280/781 |
| 6,904,996 B2 * | 6/2005 | Mita et al. | 180/336 |
| 2004/0245806 A1 * | 12/2004 | Mori et al. | 296/187.03 |
| 2006/0086551 A1 * | 4/2006 | Cleland et al. | 180/69.2 |
| 2007/0080011 A1 * | 4/2007 | Kang | 180/89.14 |
| 2009/0085377 A1 * | 4/2009 | Hayes et al. | 296/190.07 |
| 2010/0060033 A1 * | 3/2010 | Miura et al. | 296/190.05 |
| 2010/0314906 A1 * | 12/2010 | Miura et al. | 296/187.09 |
| 2010/0320803 A1 * | 12/2010 | Ishigami et al. | 296/190.08 |

FOREIGN PATENT DOCUMENTS

| | | |
|---|---|---|
| JP | 2000-168631 A | 6/2000 |
| JP | 2004-161036 A | 6/2004 |

* cited by examiner

FRONT STRUCTURE OF CAB-OVER TYPE VEHICLE

TECHNICAL FIELD

The present invention relates to a front structure of a cab-over type vehicle.

BACKGROUND ART

There is a freight vehicle (hereinafter referred to as a cab-over truck) in which a cabin (hereinafter referred to as a cab) is placed in a front portion of a chassis frame while a driver's seat is positioned generally above an engine. In such a cab-over truck, the cab is tiltably supported by the chassis frame so that an engine room can be opened to perform maintenance on the engine, and the like.

The chassis frame includes: a pair of side members disposed on both sides in the vehicle width direction and extending in the front-rear direction of the vehicle; and multiple cross members extending in the vehicle width direction so as to connect the pair of side members to each other. The cab is mounted on the chassis frame through cab mounts provided on four front, rear, right and left corners of the cab. The two front cab mounts of the cab are connected to a pair of cab mount brackets that are fixed to a front end side of an upper surface of the side members. Thus, a front portion of the cab is tiltably supported by the chassis frame.

There are various kinds of front collisions of the vehicle. In some cases, a vehicle may collide with a collided object having substantially the same height as that of the cab mount brackets (for example, a rear end of the chassis frame of a vehicle in front, and the like). In this case, a collision load toward the rear of the vehicle is applied to the cab mount brackets fixed on the side members. For this reason, an upward moment acts on front end portions of the side members. Thus, of the side members, portions where the cab mount brackets are fixed are bent and deformed.

For the purpose of preventing deformation or damage of the side members due to such a load applied to the cab mount brackets, Japanese Patent Application Publication No. Hei 10-316013 discloses a structure in which sub-frames are attached on side members while cab mount brackets are fixed to the sub-frames, so that energy is absorbed by deforming the sub-frames.

Patent Document 1: Japanese Patent Application Publication No. Hei 10-316013

DISCLOSURE OF THE INVENTION

Problems to be Solved by the Invention

Incidentally, assume that a load is applied to the cab mount brackets as described above, and portions, where the cab mount brackets are fixed, of the side members are bent and deformed. In this case, since a front lower portion of the cab is accordingly deformed, a survival space of the cab may become narrow.

Such inconvenience also occurs in a structure where the above-mentioned sub-frames are provided. In other words, since the sub-frames are provided to prevent deformation or damage of the side members, rigidity of the sub-frames needs to be set lower than that of the side members. Additionally, attachment strength of both of them needs to be set so that, if an excessively large load is applied thereto, the sub-frames may be detached from the side members before deformation of the side members. For this reason, in the structure provided with the sub-frames, the sub-frames deform as much as or more than the side members. Moreover, if the sub-frames are detached from the side members, an applied load is not dispersed over the chassis frame. Accordingly, a deformation amount of a front lower portion of the cab becomes even larger.

The present invention has been made in view of the above circumstances, and has an object to provide a front structure of a cab-over type vehicle that is capable of efficiently absorbing collision energy while suppressing deformation of a front lower portion of the cab in the event of a front collision.

Means for Solving the Problems

In order to achieve the above object, a front structure of a cab-over type vehicle according to the present invention includes a side member, a cab mount bracket, and a stiffener inner reinforcement.

The side member includes an upper plate and a lower plate that are disposed to face each other up and down, and extends in a front-rear direction of a vehicle. The cab mount bracket is fixed to the side member, and includes a bracket base mounted on the upper plate of a front end portion of the side member, and a connecting portion provided at an upper portion of the bracket base and rotatably supporting a front end lower portion of a cab. The stiffener inner reinforcement is fixed to the side member, and includes a vertical wall portion. The vertical wall portion is disposed upright in a direction that crosses the front-rear direction of the vehicle, between the upper plate and the lower plate of the side member and below a rear end edge of the bracket base of the cab mount bracket or near the rear of the rear end edge.

When a load toward the rear of the vehicle is applied to the cab mount bracket, the vertical wall portion of the stiffener inner reinforcement suppresses upward bending deformation of a front end portion of the side member by coming into direct or indirect contact with the upper plate and the lower plate of the side member.

Here, when the load toward the rear of the vehicle is applied to the cab mount bracket due to a front collision of the vehicle, an upward moment acts on a front end portion of the side member. Thus, a force acts to bend and deform a portion, where the cab mount bracket is fixed to the side member, of the side member. Such a force to bend and deform the portion is concentrated on a portion, below a rear end edge of the cab mount bracket, of the side member and near the rear thereof.

In the above configuration, the vertical wall portion of the stiffener inner reinforcement is disposed upright, in a direction that crosses the front-rear direction of the vehicle, below a rear end edge of the cab mount bracket or near the rear of the rear end edge. When a load toward the rear of the vehicle is applied to the cab mount bracket, the vertical wall portion of the stiffener inner reinforcement suppresses upward bending deformation of a front end portion of the side member by coming into direct or indirect contact with the upper plate and the lower plate of the side member. Accordingly, in an early stage where the load toward the rear of the vehicle is applied to the cab mount bracket, a front end portion of the side member is not easily bent upward locally. For this reason, local deformation in a front lower portion of the cab can be suppressed. In addition, collision energy can be efficiently absorbed in a wide range of the side member.

Moreover, when the applied load exceeds a predetermined amount, the side member is bent at a position more rearward than the position where the vertical wall portion is disposed. Accordingly, local deformation in a front lower portion of the cab can be suppressed, because the side member is bent at a position more rearward than a case where the vertical wall portion is not disposed. Note that, the cab mount bracket and the side member are preferably attached to each other with such strength that when the predetermined amount of the load is applied thereto, both of them do not separate from each other.

Furthermore, the vertical wall portion may be disposed upright in substantially the same direction as a rear end edge of the bracket base of the cab mount bracket.

In the above configuration, the vertical wall portion is disposed along a rear end edge of the bracket base that is a portion on which a bending and deforming force is concentrated, when the load toward the rear of the vehicle is applied to the cab mount bracket. Accordingly, when the load toward the rear of the vehicle is applied to the cab mount bracket, it is possible to efficiently suppress deformation of the side member, and to suppress local deformation in a front lower portion of the cab.

Effects of the Invention

According to the present invention, it is possible to efficiently absorb collision energy, and to suppress deformation of a front lower portion of the cab in the event of a front collision.

Figure 1:
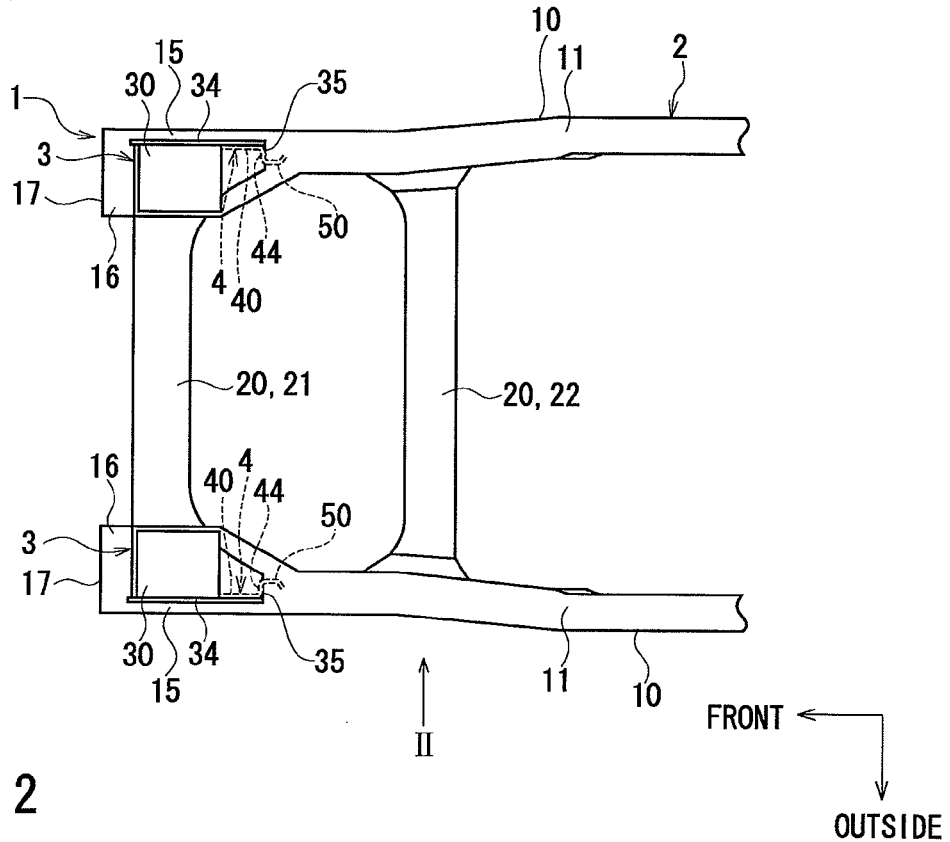
FIG. 1 is a plan view showing a front structure of a cab-over type vehicle according to this embodiment.

EXPLANATION OF REFERENCE NUMERALS 1 vehicle (cab-over type vehicle)
3 cab mount bracket
4 stiffener inner reinforcement
5 cab
10 side member
11 upper plate
12 lower plate
15 front end portion
20 cross member
30 shaft supporting portion (connecting portion)
31 bracket base
36 rear end edge
40 fixing portion
44 vertical wall portion
F load
M moment

BEST MODE FOR CARRYING OUT THE INVENTION

Hereinafter, a first embodiment of the present invention will be described with reference to the drawings.

Figure 2:
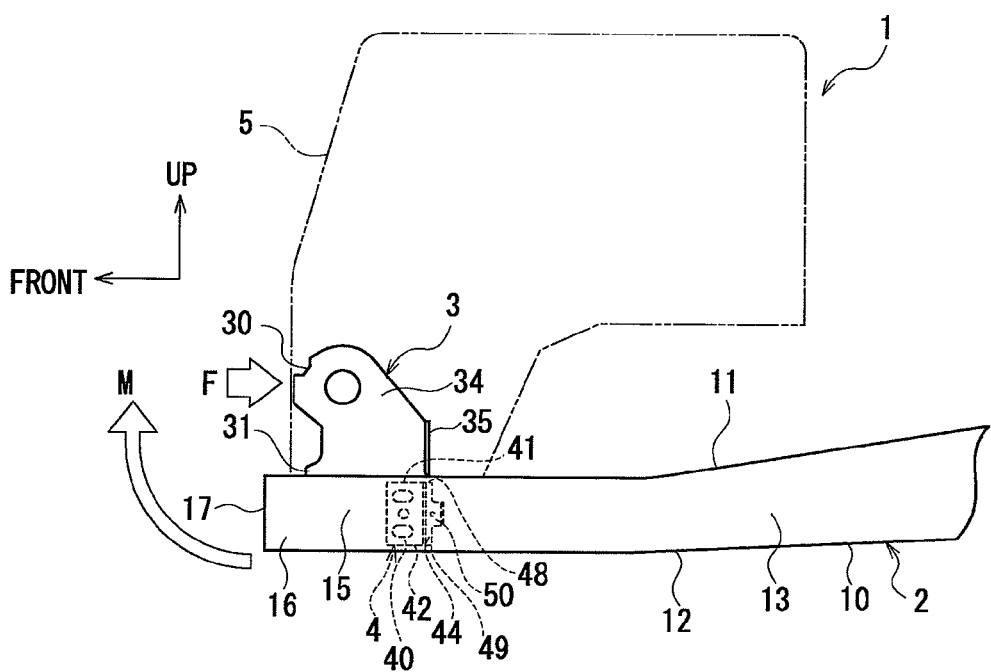
FIG. 2 is a side view as viewed in the direction of the arrow II in FIG. 1.
Figure 3:
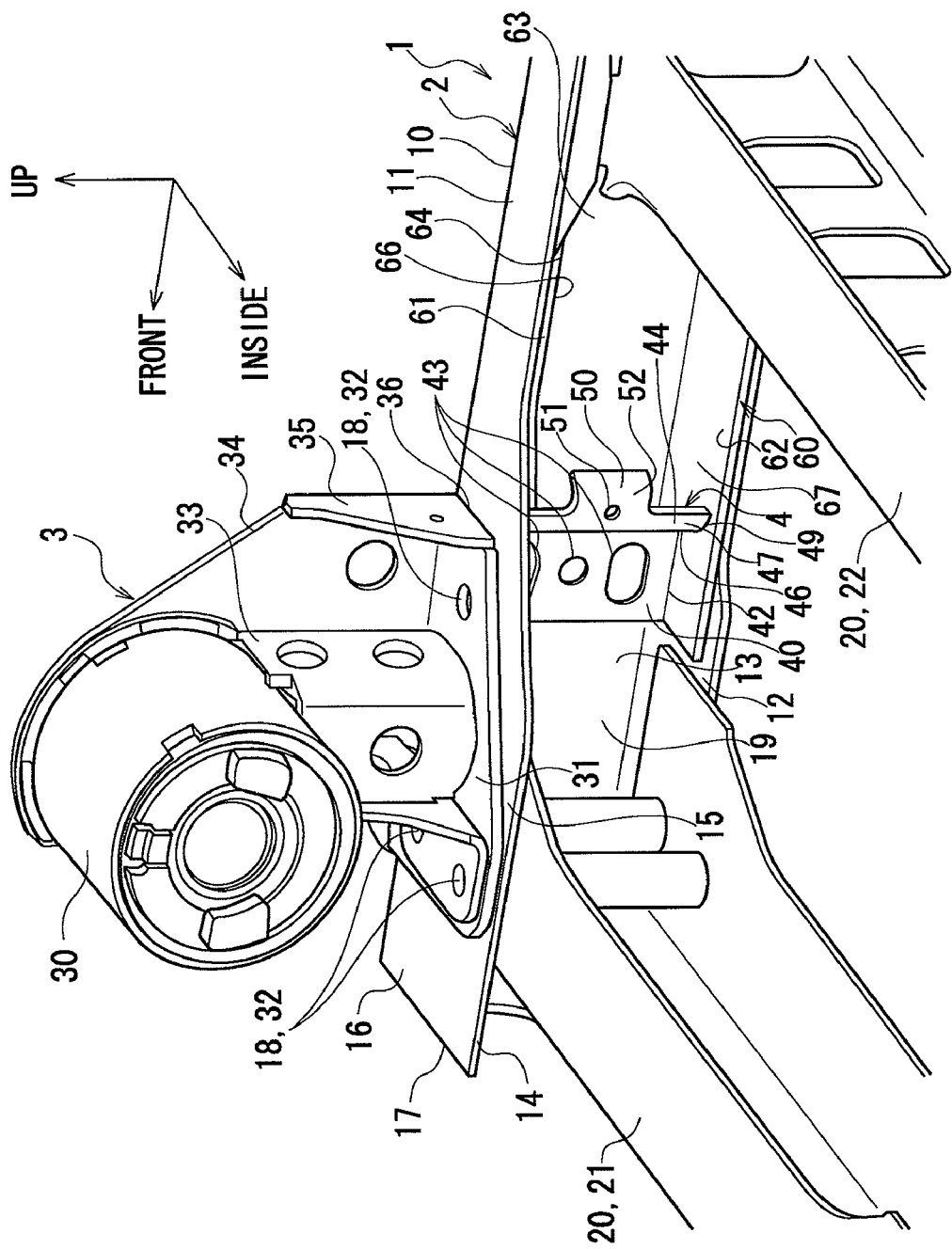
FIG. 3 is a perspective view showing a main part of FIG. 1.
Figure 4:
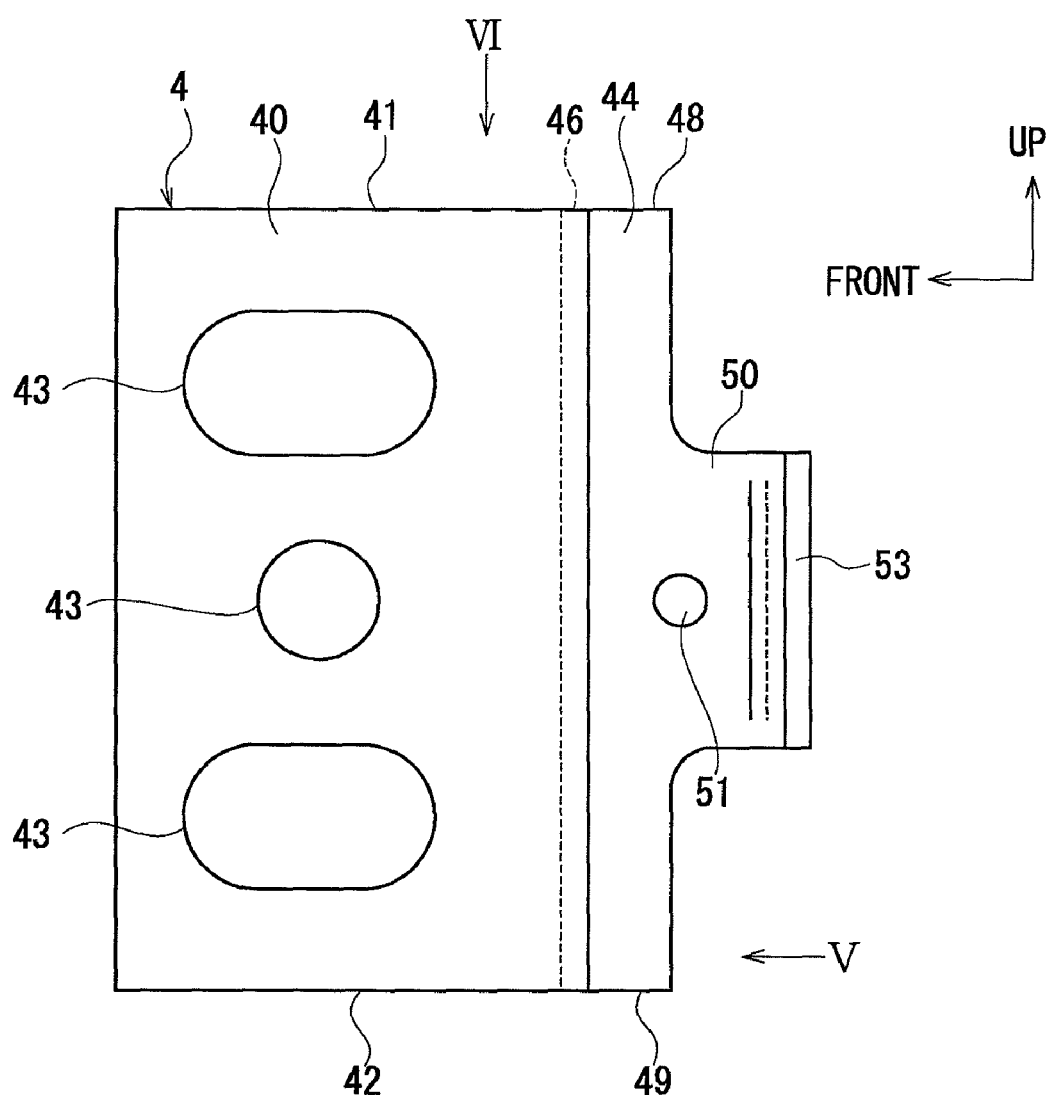
FIG. 4 is a side view of a stiffener inner reinforcement according to this embodiment.
Figure 5:
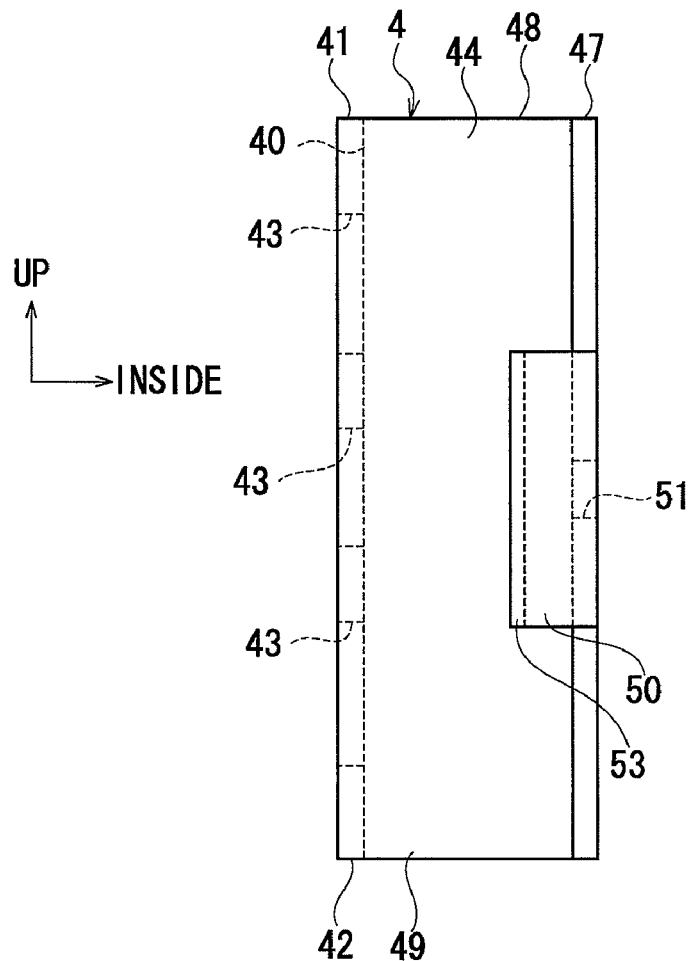
FIG. 5 is a rear view as viewed in the direction of the arrow V in FIG. 4.
Figure 6:
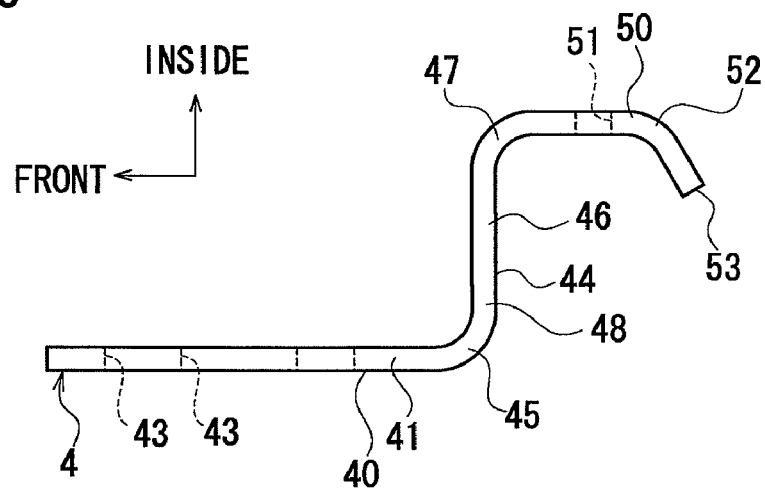
FIG. 6 is a plan view as viewed in the direction of the arrow VI in FIG. 4.

FIG. 1 is a plan view showing a front structure of a cab-over type vehicle according to this embodiment; FIG. 2 is a side view as viewed in the direction of the arrow II in FIG. 1; FIG. 3 is a perspective view showing a main part of FIG. 1; FIG. 4 is a side view of a stiffener inner reinforcement according to this embodiment; FIG. 5 is a rear view as viewed in the direction of the arrow V in FIG. 4; and FIG. 6 is a plan view as viewed in the direction of the arrow VI in FIG. 4.

As shown in FIGS. 1 to 6, a front structure of a cab-over type vehicle 1 (hereinafter referred to as a vehicle) of this embodiment includes a chassis frame 2, cab mount brackets 3, stiffener inner reinforcements 4, and a cab 5. Hereinafter, a front-rear direction represents the front-rear direction in which the vehicle advances. Additionally, in the drawings, an arrow "front" indicates the front side of the vehicle, an arrow "up" indicates the upper side of the vehicle, an arrow "inside" indicates the inner side in the vehicle width direction, and an arrow "outside" indicates the outer side in the vehicle width direction, respectively.

The chassis frame 2 includes: a pair of side members 10 that is disposed on both sides in the vehicle width direction and that extends in the front-rear direction; and multiple cross members 20 that connect the pair of side members 10.

Among the cross members 20, a first cross member 21 has a substantially U-shaped cross section with an opening facing rearward, and extends in the vehicle width direction. Among the cross members 20, a second cross member 22 has a rectangular closed cross section, and extends in the vehicle width direction.

Each side member 10 is integrally formed of an upper plate 11 and a lower plate 12 that are disposed to face each other up and down, as well as a vertical plate 13 connecting the upper plate 11 to the lower plate 12. Here, the side member 10 has a substantially U-shaped cross section with an opening 14 facing inward in the vehicle width direction, and extends in the front-rear direction. In the pair of side members 10, front end portions 15 are connected by the first cross member 21; front end edges 17 of protruding portions 16 are connected by a bumper (not illustrated), the protruding portions 16 provided to extend forward from the respective front end portions 15; and the front end portions 15 are connected by the second cross member 22 on the rear thereof. A width of each side member 10 becomes wider in the up-down direction, while the level of the lower plate 12 becomes slightly higher, from the rear of the portion connected to the second cross member 22. In the side member 10, three bracket fixing holes 18 are provided in the front end portion 15 and the rear thereof. In addition, a reinforcing member 60 is fixed to the side member 10.

The reinforcing member 60 is disposed, along an inner side surface 19 of the side member 10, from the rear of the portion connected to the first cross member 21 of the side member 10. Here, the reinforcing member 60 is integrally formed of an upper plate 61 and a lower plate 62 that are disposed to face each other up and down, as well as a vertical plate 63 connecting the upper plate 61 to the lower plate 62. Additionally, the reinforcing member 60 has a substantially U-shaped cross section with an opening 64 facing inward in the vehicle width direction. Note that, the reinforcing member 60 may have a structure in which the opening 64 of the reinforcing member 60 faces outward in the vehicle width direction, while the side member 10 and the reinforcing member 60 form a substantially rectangular closed cross section.

The cab 5 is mounted on the upper front side of the chassis frame 2 through cab mounts (not illustrated) provided at four front, rear, right and left corners of the cab 5.

Each cab mount bracket 3 is disposed from the front end portion 15 of the side member 10 to the upper portion of the rear thereof, and includes a shaft supporting portion (connecting portion) 30, a bracket base 31, a reinforcing portion 33, a side vertical wall portion 34, and a rear-end vertical wall portion 35. The shaft supporting portion 30 rotatably connects a shaft of the two cab mounts provided at the front right and left portions of the cab 5, and tiltably supports the cab 5.

The bracket base 31 constitutes a bottom portion of the cab mount bracket 3 in a range from a lower portion of the shaft supporting portion 30 to the rear of the lower portion of the shaft supporting portion 30. Here, the bracket base 31 has fastening holes 32 facing the bracket fixing holes 18, and is mounted at a position from the front end portion 15 of the side member 10 to the rear thereof. Each fastening hole 32 is fastened to a corresponding one of the bracket fixing holes 18 with a faster (not illustrated).

The reinforcing portion 33 is provided, in a range from a lower portion of the shaft supporting portion 30 to the rear thereof, between the shaft supporting portion 30 and the bracket base 31. The reinforcing portion 33 increases rigidity of the cab mount bracket 3. With this reinforcing portion 33, the load of the cab 5 is supported by the side member 10 and the first cross member 21 with the cab mount bracket 3; moreover, as described later, deformation of the cab mount bracket 3 is suppressed if a load F toward the rear is applied to the cab mount bracket 3 at the time of collision of the vehicle 1.

The side vertical wall portion 34 constitutes an outer side, in the vehicle width direction, of the cab mount bracket 3.

The rear-end vertical wall portion 35 extends upward from a rear end edge 36 of the bracket base 31, and an outer side in the vehicle width direction thereof is connected to the side vertical wall portion 34.

Each of the stiffener inner reinforcements 4 is located between the upper plate 11 and the lower plate 12 of the side member 10. Here, the stiffener inner reinforcement 4 is disposed upright between the upper plate 61 and the lower plate 62 of the reinforcing member 60, and includes a fixing portion 40, hole portions 43, a vertical wall portion 44, and a clip portion 50. Note that, in FIGS. 4 to 6, directions are indicated for the stiffener inner reinforcement 4 that is disposed on the side member 10 on the right side when viewed from the front of the vehicle 1.

The fixing portion 40 is disposed at a lower rear portion of the side vertical wall portion 34 of the cab mount bracket 3, and extends to face an inner side surface 65 of the vertical plate 63 of the reinforcing member 60. Here, the fixing portion 40 has an upper end 41 welded to a lower surface 66 of the upper plate 61 of the reinforcing member 60, and has a lower end 42 welded to an upper surface 67 of the lower plate 62 of the reinforcing member 60. The stiffener inner reinforcement 4 is fixed to the side member 10, with the reinforcing member 60 interposed therebetween, by the fixing portion 40 extending in the front-rear direction. The hole portions 43 are arranged in the fixing portion 40, and serve as referential positions of deformation, if an excessively large load is applied to the side member 10 and thus the side member 10 is bent. Additionally, since provided with the hole portions 43, the stiffener inner reinforcement 4 is not in contact with fasteners such as bolts that are used for fixing auxiliary equipment (not illustrated) to the side member 10.

The vertical wall portion 44 is disposed below the rear-end vertical wall portion 35 of the cab mount bracket 3, and includes: a first bending portion 45 bending inward in the vehicle width direction continuously from the fixing portion 40; an extension portion 46 extending in the vehicle width direction between the upper plate 61 and the lower plate 62 of the reinforcing member 60; and a second bending portion 47 bending rearward. The vertical wall portion 44 has an upper end 48 welded to the lower surface 66 on the upper plate 61 of the reinforcing member 60, and has a lower end 49 welded to the upper surface 67 on the lower plate 62 of the reinforcing member 60.

The clip portion 50 continuously extends from a central portion, in the up-down direction, of the vertical wall portion 44, and is not in contact with the upper plate 61 and the lower plate 62 of the reinforcing member 60. Here, the clip portion 50 includes a clip hole 51 and a third bending portion 52 bending outward in the vehicle width direction, and has an end edge 53 facing outward in the vehicle width direction. The clip portion 50 fixes a harness (not illustrated) for auxiliary equipment (not illustrated).

Since having a vertically symmetric shape, the stiffener inner reinforcement 4 can be used for both the right and left side members 10. The stiffener inner reinforcement 4 only needs to be fixed to the side member 10. In addition, when a force is applied to downwardly deform the side member 10 at a position where the stiffener inner reinforcement 4 is disposed, the upper ends 41, 48 and the lower ends 42, 49 only need to: come in direct contact with the upper plate 11 and the lower plate 12 of the side member 10; or come in indirect contact with the upper plate 11 and the lower plate 12 of the side member 10 by coming in contact with the upper plate 61 and the lower plate 62 of the reinforcing member 60. In other words, the stiffener inner reinforcement 4 may be disposed between the upper plate 11 and the lower plate 12 of the side member 10 without the reinforcing member 60 being disposed; alternatively, gaps may exist between the upper ends 41, 48 of the stiffener inner reinforcement 4 and each of the upper plates 11, 61, and between the lower ends 42, 49 thereof and each of the lower plates 12, 62. In addition, the vertical wall portion 44 of the stiffener inner reinforcement 4 only needs to have a shape extending in a direction that crosses the front-rear direction and, for example, may have a structure including a cylindrical or a semi-cylindrical cross-sectional shape in the horizontal direction. Moreover, the vertical wall portion 44 of the stiffener inner reinforcement 4 may be disposed below the rear-end vertical wall portion 35 of the cab mount bracket 3 (below the rear end edge 36 of the bracket base 31), and near the rear thereof.

Next, application of the load F to the cab mount bracket 3 in this embodiment will be described.

When the load F toward the rear is applied to the cab mount bracket 3 due to a front collision of the vehicle 1, the reinforcing portion 33 of the cab mount bracket 3 firstly suppresses deformation of the cab mount bracket 3. In this event, most energy of the load F applied to the cab mount bracket 3 is not absorbed by the cab mount bracket 3, but is applied to the side member 10. Then, a force acts on the side member 10 to bend the side member 10 downward, from the rear end edge 36 of the bracket base 31 of the cab mount bracket 3. Thus, an upward moment M acts on the side of the protruding portion 16 of the side member 10. In order to enhance rigidity against application of the moment M, the stiffener inner reinforcement 4 is provided in this embodiment.

In this embodiment, the vertical wall portion 44 of the stiffener inner reinforcement 4 is disposed upright, in the vehicle width direction that crosses the front-rear direction, below the rear end edge 36 of the bracket base 31 of the cab mount bracket 3. Additionally, when the load F toward the rear is applied to the cab mount bracket 3, the upper ends 41, 48 and the lower ends 42, 49 of the stiffener inner reinforcement 4 respectively come into indirect contact with the upper plate 11 and the lower plate 12 of the side member 10 with the upper plate 61 and the lower plate 62 of the reinforcing member 60 interposed therebetween, respectively. Thus, upward bending deformation of the protruding portion 16 on the front end side of the side member 10 is suppressed.

Accordingly, in an early stage where the load F toward the rear is applied to the cab mount bracket 3, a region formed below the cab mount bracket 3 of the side member 10 is not easily bent locally. For this reason, local deformation in a front lower portion of the cab 5 can be suppressed. In addition, collision energy can be efficiently absorbed in a wide range of the side member 10.

Moreover, the upper ends 41, 48 and the lower ends 42, 49 of the stiffener inner reinforcement 4 are generally welded to the upper plate 61 and the lower plate 62 of the reinforcing member 60 that are fixed to the upper plate 11 and the lower plate 12 of the side member 10, respectively. For this reason, no gap exists between the upper ends 41, 48 and the upper plate 61 and between the lower ends 42, 49 and the lower plate 62. Accordingly, the stiffener inner reinforcement 4 can function immediately after application of the moment M, and suppress deformation of the side member 10.

Furthermore, when the applied load F exceeds a predetermined amount, the side member 10 is bent at a position more rearward than the position where the vertical wall portion 44 is disposed. Accordingly, local deformation in a front lower portion of the cab 5 can be suppressed, because the side member 10 is bent at a position more rearward than a case where the vertical wall portion 44 is not disposed. Note that, the cab mount bracket 3 and the side member 10 are fastened to each other with such strength that both of them do not separate from each other even if the predetermined amount of the load F is applied thereto.

Hereinabove, the embodiment employing the invention made by the present inventor has been described. However, the present invention is not limited to the description and the drawings which constitute a part of the disclosure of the present invention according to this embodiment. In other words, it should of course be noted that other embodiments, examples, operational techniques, and the like which are made, based on this embodiment, by those skilled in the art are all included in the category of the present invention.

INDUSTRIAL APPLICABILITY

The present invention is preferably used for various cab-over type vehicles.

The invention claimed is:

1. A front structure of a cab-over type vehicle, the front structure comprising:
   a side member including an upper plate, a lower plate, and a vertical plate, the upper plate and the lower plate are disposed to face each other up and down, and extending in a front-rear direction of a vehicle, the vertical plate connecting the upper plate to the lower plate;
   a cab mount bracket fixed to the side member, and including:
     a bracket base mounted on the upper plate of a front end portion of the side member, and
     a connecting portion provided at an upper portion of the bracket base and rotatably supporting a front end lower portion of a cab; and
   a stiffener inner reinforcement fixed to the side member, and including a vertical wall portion which extends upright in a direction that crosses the front-rear direction of the vehicle, from the upper plate to the lower plate of the side member, and is disposed below a rear end edge of the bracket base of the cab mount bracket or near a rear of the rear end edge,
   wherein, when a load toward the rear of the vehicle is applied to the cab mount bracket, the vertical wall portion of the stiffener inner reinforcement suppresses upward bending deformation of the front end portion of the side member by coming into direct or indirect contact with the upper plate and the lower plate of the side member.

2. The front structure of a cab-over type vehicle according to claim 1, wherein the vertical wall portion is disposed upright in substantially the same direction as the rear end edge of the bracket base of the cab mount bracket.

* * * * *